United States Patent
Takechi

(10) Patent No.: US 9,419,723 B2
(45) Date of Patent: Aug. 16, 2016

(54) OPTICAL RECEIVER AND METHOD FOR MANUFACTURING THE SAME

(71) Applicant: Sumitomo Electric Industries, Ltd., Osaka-shi (JP)

(72) Inventor: Masaru Takechi, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 103 days.

(21) Appl. No.: 14/221,008

(22) Filed: Mar. 20, 2014

(65) Prior Publication Data

US 2014/0286651 A1    Sep. 25, 2014

(30) Foreign Application Priority Data

Mar. 22, 2013  (JP) ................................ 2013-060300

(51) Int. Cl.
  *H04B 10/61* (2013.01)

(52) U.S. Cl.
  CPC ............ *H04B 10/615* (2013.01); *H04B 10/614* (2013.01); *Y10T 29/49002* (2015.01)

(58) Field of Classification Search
  CPC ............... H04B 10/615; H04B 10/614; Y10T 29/49002
  See application file for complete search history.

(56) References Cited

U.S. PATENT DOCUMENTS

| | | | |
|---|---|---|---|
| 2004/0184729 A1* | 9/2004 | Martin ................. | G02B 6/4249 385/33 |
| 2012/0235024 A1* | 9/2012 | Marsland, Jr. ....... | H04B 10/613 250/208.2 |

FOREIGN PATENT DOCUMENTS

| DE | WO 2012150197 A1 * | 11/2012 | ............. H04B 10/64 |
|---|---|---|---|
| JP | 2011-188132 | 9/2011 | |

* cited by examiner

*Primary Examiner* — Leslie Pascal
(74) *Attorney, Agent, or Firm* — Venable LLP; Michael A. Sartori; Laura G. Remus

(57) ABSTRACT

An optical receiver for coherent optical communication, includes: a splitting element that splits a signal light into two optical axes; optical hybrids each of which is coupled with the two split optical axes; a skew adjustment element that is arranged on one of the optical axes, and adjusts a difference between optical path lengths of the two optical axes between the splitting element and the optical hybrids; a carrier; an adhesive that is filled between the skew adjustment element and the carrier; and a void that is located at an end portion of an optical axis direction of the skew adjustment element in a region where the skew adjustment element and the carrier are opposed to each other, the void being not filled up with the adhesive.

8 Claims, 13 Drawing Sheets

OPTICAL RECEIVER AND METHOD FOR MANUFACTURING THE SAME

CROSS-REFERENCE TO RELATED APPLICATION

This application is based upon and claims the benefit of priority of the prior Japanese Patent Application No. 2013-060300 filed on Mar. 22, 2013, the entire contents of which are incorporated herein by reference.

BACKGROUND (i) Technical Field

A certain aspect of the embodiments discussed herein is related to an optical receiver and a method for manufacturing the same which are used for coherent optical communication.

(ii) Related Art

There has been known a coherent optical communication system as a high-speed and high-capacity optical communication system. In an optical receiver of the coherent optical communication system, after a signal light is split into an X-polarization beam and a Y-polarization beam which intersect perpendicularly mutually by a splitting element, an optical hybrid performs interference of the signal light and a local oscillator light (LO light), and then a light receiving element converts an optical signal into an electrical signal.

Japanese Patent Application Publication No. 2011-188132 discloses a coherent optical receiver.

SUMMARY

It is an object to provide an optical receiver and a method for manufacturing the same that can reduce an optical loss in a skew adjustment element and can be made small in size.

According to an aspect of the present invention, there is provided an optical receiver for coherent optical communication, including: a splitting element that splits a signal light into two optical axes; optical hybrids each of which is coupled with the two split optical axes; a skew adjustment element that is arranged on one of the optical axes, and adjusts a difference between optical path lengths of the two optical axes between the splitting element and the optical hybrids; a carrier; an adhesive that is filled between the skew adjustment element and the carrier; and a void that is located at an end portion of an optical axis direction of the skew adjustment element in a region where the skew adjustment element and the carrier are opposed to each other, the void being not filled up with the adhesive.

DETAILED DESCRIPTION

In the above-mentioned coherent optical receiver, optical path lengths in which lights split by a polarization splitting element reach the optical hybrid differ from each other, so that the phase delay (i.e., a skew) of the optical signal occurs. Since a skew adjustment element is built into the package of the light receiver, it is desirable that the size of the skew adjustment element is as small as possible. An optical loss when the optical signal passes through the skew adjustment element may increase according to material selection of the skew adjustment element.

First, a description will be given of the whole configuration of an optical receiver common to first to third embodiments and a comparative example. Next, a description will be given of the optical receiver according to the comparative example, and then a description will be given of the optical receiver according to the first to third embodiments.

Figure 1:
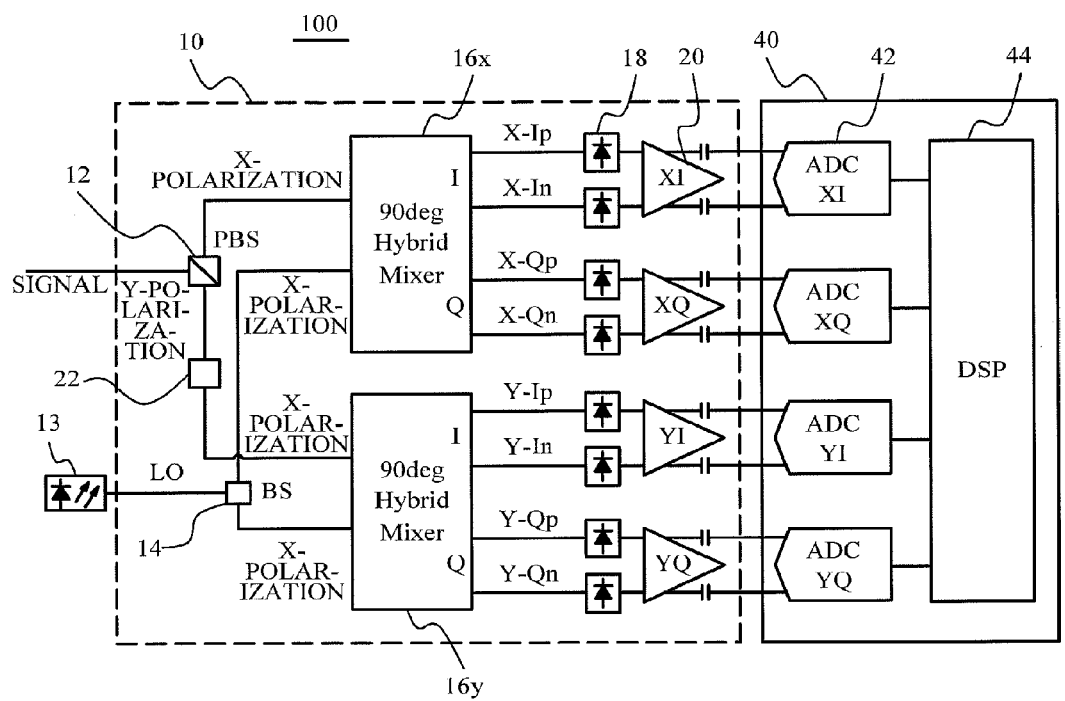
FIG. 1 is a whole block diagram of an optical receiver according to a first embodiment and a comparative example.

FIG. 1 is a whole block diagram of an optical receiver according to the first embodiment and the comparative example. An optical receiver 100 is an optical receiver used for coherent optical communication. The optical receiver 100 includes an optical signal processing unit 10 that processes an optical signal, and an electrical signal processing unit 40 that is connected to a subsequent stage of the optical signal processing unit 10 and processes an electrical signal.

The optical signal processing unit 10 includes a splitting element 12 (PBS: Polarization Beam Splitter), a beam splitter 14 (BS), optical hybrids 16, light receiving elements 18, and amplifiers 20, a polarization rotation element 22. The optical signal processing unit 10 further includes skew adjustment elements, lenses, mirrors (illustrated in FIG. 2), and so on, but these are omitted in FIG. 1. The electrical signal processing unit 40 includes analog-digital converters (ADC) 42 and a digital signal processor (DSP) 44.

The splitting element 12 splits a signal light (SIGNAL) introduced by an optical fiber of a single mode (SMF: Single Mode Fiber) into an X-polarization beam and a Y-polarization beam which intersect perpendicularly mutually. The X-polarization beam enters an X-side optical hybrid 16x. After a plane of polarization is rotated 90 degrees by the polarization rotation element 22 and the Y-polarization beam becomes the X-polarization beam, the X-polarization beam enters a Y-side optical hybrid 16y. For example, a TM (Transverse Magnetic) light can be used as the X-polarization beam, and a TE (Transverse Electric) light can be used as the Y-polarization beam. However, the TE light may be used as the X-polarization beam and the TM light may be used as the Y-polarization beam.

The beam splitter 14 splits into the X-side and the Y-side a local oscillator light (LO light) introduced with a polarization maintaining Fiber (PMF) from an external local oscillator light source device 13. The local oscillator light (LO light) is beforehand set as the X-polarization beam, and enters the X-side optical hybrid 16x and the Y-side optical hybrid 16y.

Each of the optical hybrids (16x, 16y) performs dispersion, synthesis and delay of the incident signal light and the incident local oscillator light with an internal optical circuit, and outputs coherent lights from four ports. Each optical hybrid 16 can be composed of a quartz planar lightwave circuit (PLC), for example. After the signal light (SIGNAL) of the X-polarization beam is synthesized with the local oscillator light (LO) by the optical hybrid 16x, the signal light (SIGNAL) of the X-polarization beam is divided into a positive component (p) and a negative component (n) of an in-phase component I (In-Phase) and an orthogonal phase component Q (Quadrature), respectively, and the divided components are outputted as four optical signals (X-Ip, X-In, X-Qp and X-Qn). Similarly, after the signal light (SIGNAL) of the Y-polarization beam is also synthesized with the local oscillator light (LO) by the optical hybrid 16y, the signal light (SIGNAL) of the Y-polarization beam is divided into a positive component (p) and a negative component (n) of an in-phase component I (In-Phase) and an orthogonal phase component Q (Quadrature), respectively, and the divided components are outputted as four optical signals (Y-Ip, Y-In, Y-Qp and Y-Qn).

The light receiving elements 18 converts photoelectrically the coherent lights outputted from the optical hybrids (16x, 16y) to analog electrical signals. Each light receiving element 18 includes a photodiode (PD), for example. Each of the amplifier 20 synthesizes a pair of the positive component and the negative component of the electrical signal outputted from the light receiving elements 18, and amplifies the synthesized signal. Each of the amplifier 20 includes a Trans-Impedance Amplifier (TIA), for example. The amplified electrical signal is outputted from an electrical output terminal of the optical signal processing unit 10, and is inputted to the electrical signal processing unit 40.

Each of the analog-digital converters (ADC) 42 converts an analog electrical signal outputted from the optical signal processing unit 10, into a digital signal by the analog-digital conversion. The digital signal processor 44 performs various signal processing including the demodulation of a signal, to the converted digital signal. By the above-mentioned processing, the digital coherent communication can be performed.

Figure 2:
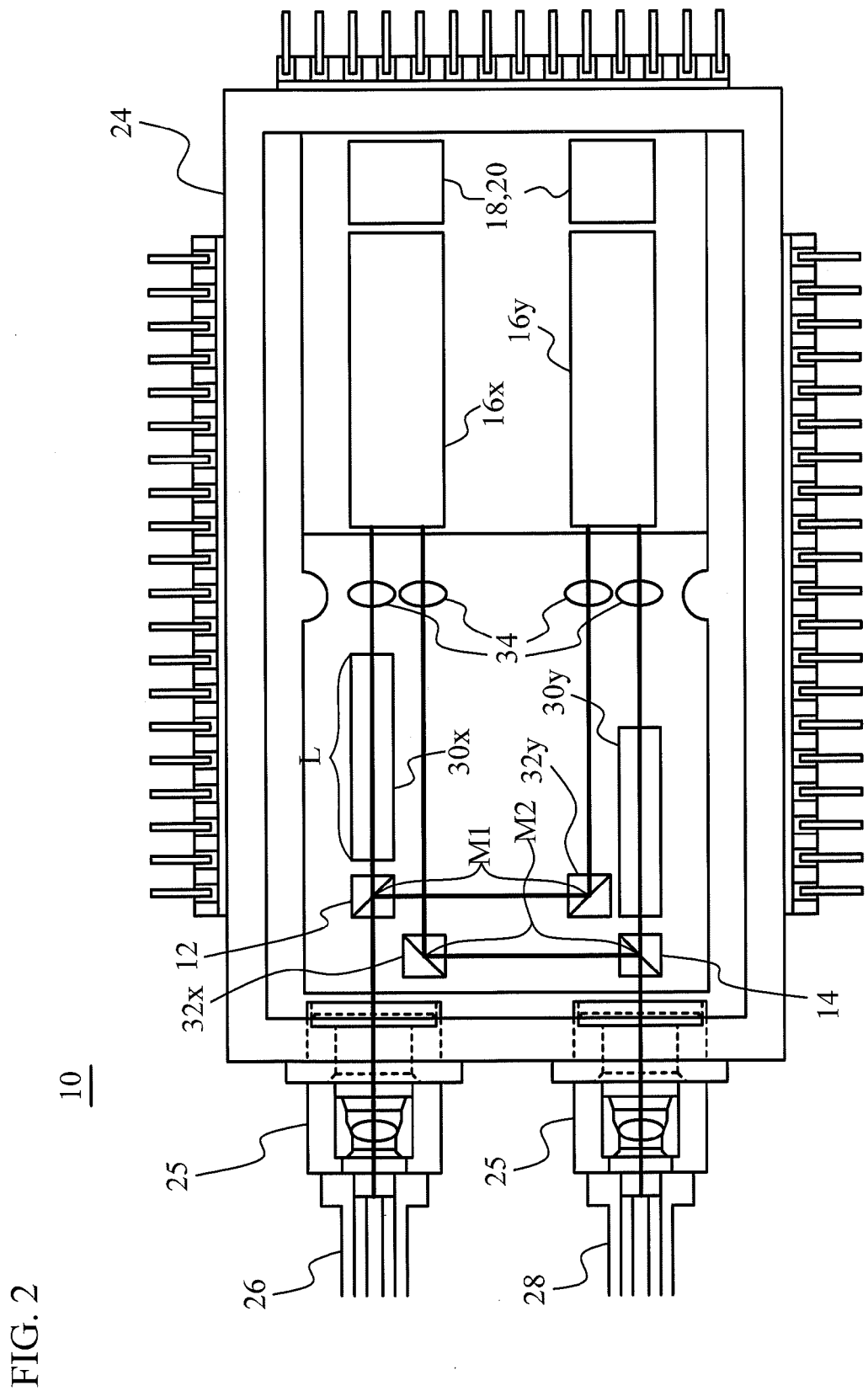
FIG. 2 is a diagram illustrating a mounting form of the optical receiver according to the first embodiment and the comparative example.

FIG. 2 is a diagram illustrating a mounting form of the optical receiver according to the first embodiment and the comparative example. In FIG. 2, only the internal structure of the optical signal processing unit 10 is illustrated, and the indication about the electrical signal processing unit 40 is omitted. Components identical with those of FIG. 1 are designated by identical reference numerals, and detailed description thereof is omitted.

As illustrated in FIG. 2, a single mode optical fiber 26 for introducing the signal light (SIGNAL) and a polarization maintaining optical fiber 28 for introducing the local oscillator light (LO light) are connected to connectors 25 provided in a housing 24 of the optical signal processing unit 10. In the housing 24, mirrors 32, lenses 34, and skew adjustment elements 30 other than composition explained by FIG. 1 are arranged.

The mirrors 32x and 32y are arranged at subsequent stages of the splitting element 12 and the beam splitter 14, respectively, change directions of movement of the lights by 90 degrees, and guide the lights in directions of the optical hybrids 16. The lenses 34 are arranged at preceding stages of the optical hybrids 16, condense the lights which have passed the mirrors 32x and 32y and the skew adjustment elements 30x and 30y, and introduces the lights into the optical hybrids 16x and 16y. The skew adjustment elements 30x and 30y are arranged in the housing 24. The skew adjustment element 30x is arranged between the splitting element 12 and one of the lenses 34, and the skew adjustment element 30y is arranged between the beam splitter 14 and one of the lens 34, respectively.

Here, the X-polarization beam among the signal lights split with the splitting element 12 advances straight, and is introduced into the optical hybrid 16x of the X-side. On the contrary, the Y-polarization beam among the signal lights split with the splitting element 12 is once reflected by the mirror 32y, and is introduced into the optical hybrid 16y of the Y-side. Therefore, the transmission distance of the Y-polarization beam becomes long by only a distance M1 between the splitting element 12 and the mirror 32y. A phase delay occurs, compared with the X-polarization beam.

Also in the local oscillator light (LO light) split with the beam splitter 14, the light of the Y-side advances straight, and is introduced into the optical hybrid 16y of the Y-side. On the contrary, the light of the X-side is once reflected by the mirror 32x, and is introduced into the optical hybrid 16x of the X-side. Therefore, the transmission distance of the light of the X-side becomes long by only a distance M2 between the beam splitter 14 and the mirror 32x. The phase delay occurs, compared with the light of the Y-side.

When the above-mentioned distances M1 and M2 are 5 mm, for example, delay time becomes 17p seconds. This is a value which far exceeds 10p seconds which are the channel skew time decided by the specification of OIF (Optical Internetworking Forum), and the delay time cannot be disregarded on design. The above-mentioned channel skew indicates the total of the delay time in all the optical systems and all the electric systems. Therefore, it is desirable that the delay time between the X-polarization beam and the Y-polarization beam is essentially equal to or less than 5p seconds, and it is more desirable that the delay time between the X-polarization beam and the Y-polarization beam is equal to or less than 2p seconds.

Therefore, the skew adjustment element 30x is arranged between the splitting element 12 and one of the lenses 34, as illustrated in FIG. 2. The skew adjustment element 30x is an element for adjusting a difference between optical path lengths of two optical axes between the splitting element 12 and the optical hybrids 16 (16x, 16y). When the length of the skew adjustment element 30x in an optical axis direction is "L" and a refraction index is "N", the optical path length at the time of passing the skew adjustment element 30x increases only $(1-N) \cdot L$ by air conversion. Thereby, the phase delay caused by the difference between the optical path lengths corresponding to the distance M1 can be compensated, and the delay time between the X-polarization beam and the Y-polarization beam can be adjusted to 5p seconds or less, or 2p seconds or less.

Also in the local oscillator light (LO light), the skew adjustment element 30y is arranged between the beam splitter 14 and one of the lenses 34, so that the difference between the optical path lengths of the X-side and the Y-side can be adjusted like the case of signal light (SIGNAL), and the delay time can be made into 5p seconds or less, or 2p seconds or less.

Next, a description will be given of detailed configuration of the skew adjustment element 30 (30x and 30y).

Figure 3A:
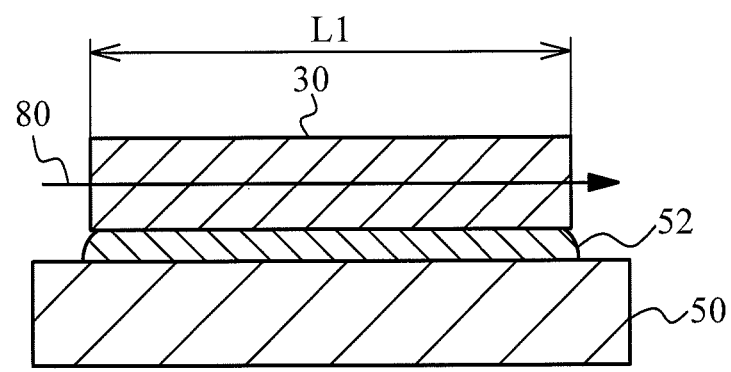
FIGS. 3A and 3B are diagrams illustrating detailed configuration of the optical receiver according to a first comparative example.
Figure 3B:
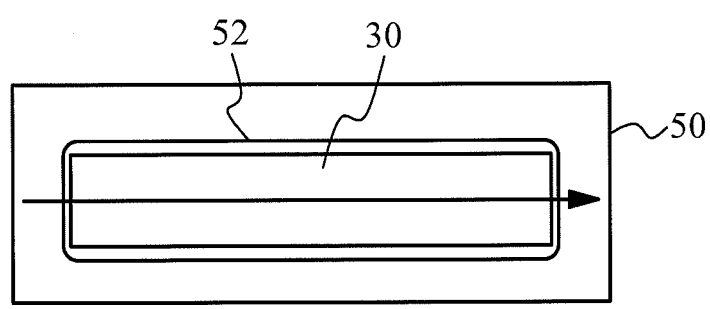

(COMPARATIVE EXAMPLE) FIGS. 3A and 3B are diagrams illustrating detailed configuration of the optical receiver according to a first comparative example. FIG. 3A illustrates schematically a cross-sectional diagram of the skew adjustment element, and FIG. 3B illustrates schematically a top view of the skew adjustment element. As illustrated in FIG. 3A, the skew adjustment element 30 is mounted on a carrier 50. The adhesive 52 is filled between the skew adjustment element 30 and the carrier 50, and the skew adjustment element 30 is fixed to the carrier 50 by the adhesive 52. As illustrated in FIGS. 3A and 3B, the adhesive 52 is applied on a surface of the carrier 50 opposite to the skew adjustment element 30, i.e., all opposed domain between the carrier 50 and the skew adjustment element 30. That is to say, all the domain between the surfaces of the skew adjustment element 30 and the carrier 50 which are opposed to each other is filled up with the adhesive 52. In the first comparative example, a glass is used as the skew adjustment element 30, and a resin is used as the adhesive 52.

Figure 4A:
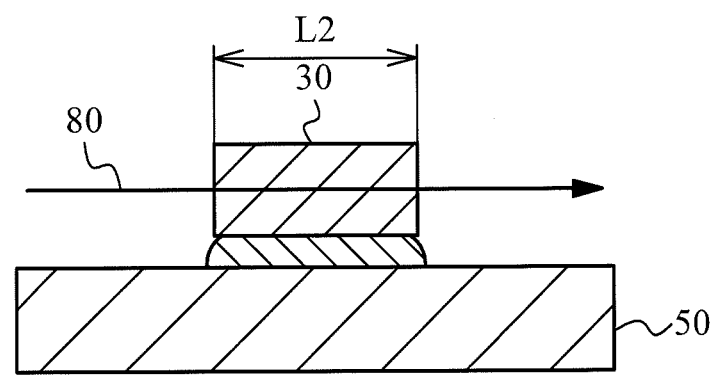
FIGS. 4A and 4B are diagrams illustrating detailed configuration of the optical receiver according to a second comparative example.
Figure 4B:
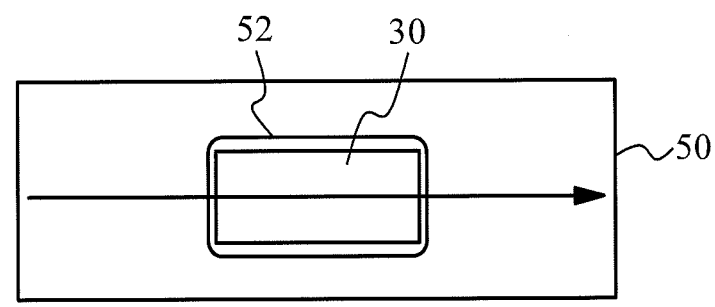

FIGS. 4A and 4B are diagrams illustrating detailed configuration of the optical receiver according to a second comparative example. FIG. 4A illustrates schematically a cross-sectional diagram, and FIG. 4B illustrates schematically a top view. The basic configuration of the skew adjustment element 30 and the carrier 50 is the same as that of FIG. 3, and detailed description thereof is omitted. In the second comparative example, silicon (Si) is used as the skew adjustment element 30. Since the refractive index of the silicon is large compared with the glass, the silicon can make the length L of the skew adjustment element 30 in the optical axis direction small even when the difference between the same optical path lengths is rectified.

When the difference between the optical path lengths to be rectified is 5.5 mm as described above, the length L1 of the skew adjustment element 30 is 5.1 mm with glass of the refractive index 2.07, or 11 mm with glass of the refractive index 1.50 (see FIG. 3A). On the contrary, when silicon x of the refractive index 3.48 is used, the length L2 of the skew adjustment element 30 is 2.2 mm (see FIG. 4A). Thus, since the skew adjustment element 30 can be miniaturized by using material with a large refractive index for the skew adjustment element 30, the size of the optical receiver 100 can also be miniaturized. When glass is used for the material of the skew adjustment element 30, the refractive index of about 2 is a maximum, but when silicon is used for the material, it is possible to realize the refractive index of 3 or more as mentioned above.

Here, when the carrier 50 is transformed by change of temperature or the like, the skew adjustment element 30 mounted on the carrier 50 is transformed, the optical axis is shifted, the rate of optical coupling from the optical fiber (26, 28) to the optical hybrid 16 may be changed, and hence an optical coupling loss may occur. Specifically, since a thermal expansion coefficient of the carrier 50 is generally larger than the thermal expansion coefficient of the skew adjustment element 30, the skew adjustment element 30 warps. As a result of performing simulation about the above-mentioned optical loss, the knowledge as illustrated in FIG. 5 described below has been acquired. The simulation has been performed under the following conditions. An Example in which the thermal expansion coefficient of the carrier 50 is larger than that of the skew adjustment element 30 is explained. The thermal expansion coefficient of the carrier 50 may be smaller than that of the skew adjustment element 30. In the present comparative example, since the thermal expansion coefficients of the carrier 50 and the skew adjustment element 30 differ from each other, the skew adjustment element 30 warps.

The size of the carrier 50 has been 19 mm in length of the optical axis direction, 9.8 mm in width, and 1.25 mm in height. Iron nickel cobalt (FeNiCo) alloy has been used for the material of the carrier 50. Young's modulus of the FeNiCo alloy has been set to 159 [GPa], Poisson's ratio of the FeNiCo alloy has been set to 0.3, and the thermal expansion coefficient of the FeNiCo alloy has been set to $6.0 \times 10^{-6}$ [1/K].

The size of the skew adjustment element 30 according to the first comparative example has been 5.1 mm in length of the optical axis direction, 1 mm in width, and 1 mm in height. The glass of the refractive index n=2.07 has been used for the material of the skew adjustment element 30. Young's modulus of the glass has been set to 75.3 [GPa], Poisson's ratio of the glass has been set to 0.247, and the thermal expansion coefficient of the glass has been set to $7.9 \times 10^{-6}$ [1/K].

The size of the skew adjustment element 30 according to the second comparative example has been 2.2 mm in length of the optical axis direction, 1 mm in width, and 1 mm in height. The silicon (Si) of the refractive index n=3.48 has been used for the material of the skew adjustment element 30. Young's modulus of the silicon has been set to 170 [GPa], Poisson's ratio of the silicon has been set to 0.3, and the thermal expansion coefficient of the silicon has been set to $2.4 \times 10^{-6}$ [1/K].

Under the above conditions, the temperature of the housing 24 in which the skew adjustment element 30 is built has been changed from 25 degrees to 85 degrees, and a light displacement amount and an optical coupling loss after transformation of the skew adjustment element 30 have been calculated. Here, the adhesive 52 was epoxy resin having a thickness of 50 μm.

Figure 5A:
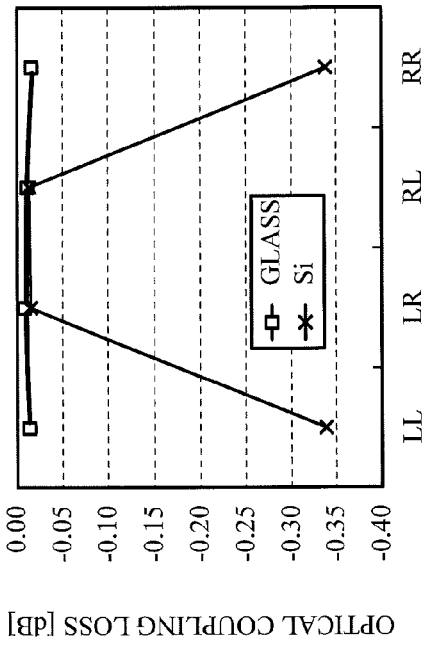
FIGS. 5A to 5D are graphs illustrating simulation results of the optical receiver according to the comparative example.
Figure 5C:
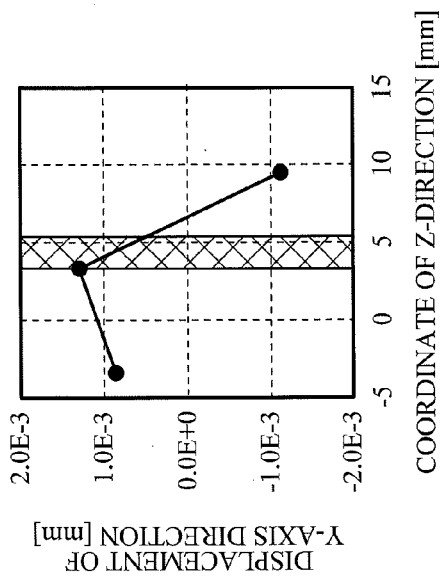
Figure 5B:
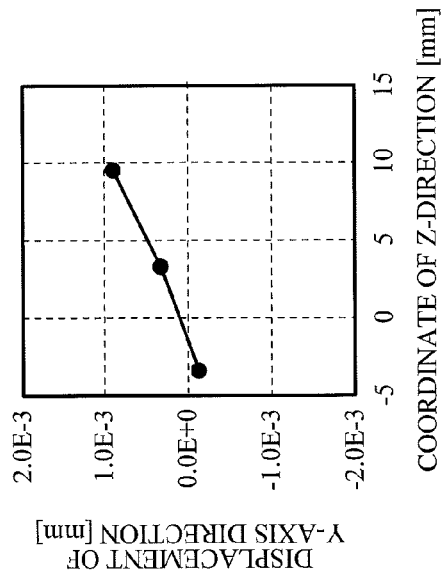

FIGS. 5A to 5D are graphs illustrating simulation results of the optical receiver according to the comparative example. FIG. 5A is a graph which indicates the light displacement amount in a route (hereinafter referred to as "LL") of the signal light side on which the skew adjustment element 30 exists, according to the second comparative example. A horizontal axis indicates the coordinate [mm] of the direction of movement of light (Z-direction), and a vertical axis indicates the light displacement amount [mm] in a vertical direction (Y-direction) to an optical axis. A domain illustrated by a shading portion in FIG. 5A is a domain where the skew adjustment element 30 exists. FIG. 5B is a graph which indicates the light displacement amount in a route (hereinafter referred to as "LR") of the local oscillator light (LO light) side on which the skew adjustment element 30 does not exist, according to the second comparative example. A horizontal axis indicates the coordinate [mm] of the direction of movement of light (Z-direction), and a vertical axis indicates the light displacement amount [mm] in a vertical direction (Y-direction) to an optical axis.

When FIGS. 5A and 5b are compared to each other, in the route (LR) on which the skew adjustment element 30 does not exist, the light displacement amount increases monotonously to the direction of movement (Z-direction) of light. On the contrary, in the route (LL) on which the skew adjustment element 30 exists, the light displacement amount of LL is the same as that of LR up to the entrance of the skew adjustment element 30. However, at the exit of the skew adjustment element 30, inclination of the light displacement amount is changed from positive to negative rapidly. This is because the angle of emission of the light in the exit of the skew adjustment element 30 changes downward (i.e., a side of the carrier 50).

FIG. 5C is a graph illustrating respective optical coupling loss [dB] of a route (hereinafter referred to as "RL") of the signal light side on which the skew adjustment element 30 does not exist, and a route (hereinafter referred to as "RR") of the local oscillator light (LO light) side on which the skew adjustment element 30 exists, in addition to the above-mentioned two routes (LL and LR). When glass is used as the skew adjustment element 30 (the first comparative example) as illustrated in FIG. 5C, the optical coupling losses of every routes are about −0.01 dB, and no large difference exists. On the contrary, when silicon is used as the skew adjustment element 30 (the second comparative example), the optical coupling losses of the routes (LR and RL) in which the skew adjustment element 30 does not exist are the same as the optical coupling losses in the case of glass. However, the optical coupling losses of the routes (LL and RR) in which the skew adjustment element 30 made of the silicon exists are very large, i.e., −0.34 dB.

The above-mentioned routes correspond to respective optical elements of FIG. 2 as follows:

LL: A route in which the light enters into the X-side optical hybrid 16x through the skew adjustment element 30x from the splitting element 12;

LR: A route in which the light enters into the X-side optical hybrid 16x through the mirror 32x from the beam splitter 14;

RL: A route in which the light enters into the Y-side optical hybrid 16y through the mirror 32y from the splitting element 12; and RR: A route in which the light enters into the Y-side optical hybrid 16y through the skew adjustment element 30y from the beam splitter 14.

Figure 5D:
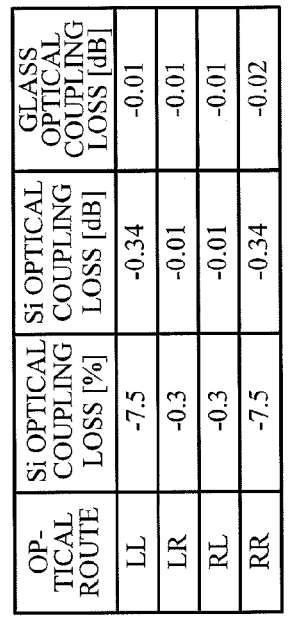

FIG. 5D illustrates a table in which the above-mentioned simulation results are organized. In addition, an optical attenuation factor [%] calculated from each optical coupling loss is indicated in the left-hand column of the table. When the silicon is used as the skew adjustment element 30 (the second comparative example), in the routes (LR and RL) in which the skew adjustment element 30 does not exist, the optical attenuation factor is a small value, i.e., −0.3%. However, in the routes (LL and RR) in which the skew adjustment element 30 exists, the optical attenuation factor is a large value, i.e., −7.5%.

Figure 6A:
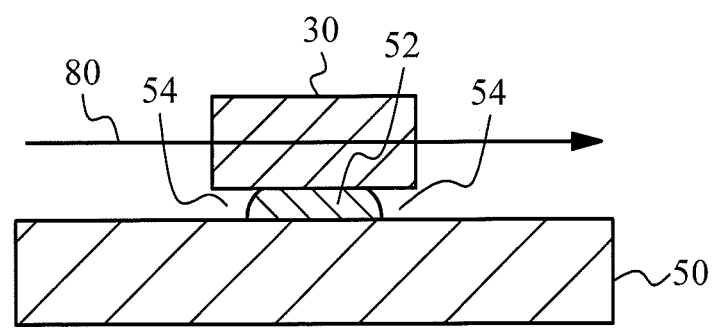
FIGS. 6A and 6B are diagrams illustrating detailed configuration of the optical receiver according to the first embodiment.
Figure 6B:
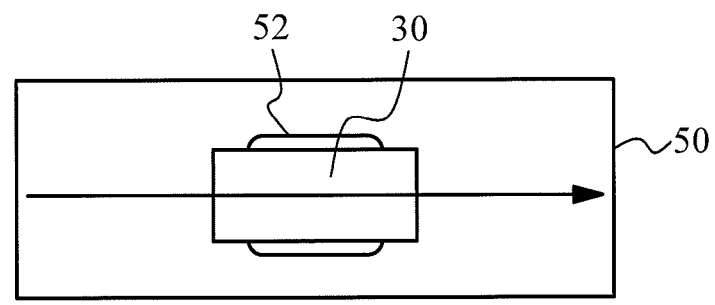

(FIRST EMBODIMENT) FIGS. 6A and 6B are diagrams illustrating detailed configuration of the optical receiver according to the first embodiment. FIG. 6A illustrates schematically a cross-sectional diagram of the skew adjustment element, and FIG. 6B illustrates schematically a top view of the skew adjustment element. As illustrated in FIG. 6A, the skew adjustment element 30 is mounted on the carrier 50. The adhesive 52 is filled between the skew adjustment element 30 and the carrier 50, and the skew adjustment element 30 is fixed to the carrier 50 by the adhesive 52.

In the first embodiment, the silicon (Si) is used for the skew adjustment element 30. The epoxy resin can be used for the adhesive 52, for example. As with the comparative example, the iron nickel cobalt (FeNiCo) alloy can be used for the carrier 50, for example. Copper tungsten (CuW) in which Cu composition is 10 to 20% can be used for the material of the carrier 50. In this case, the thermal expansion coefficient of the carrier 50 is $6.5 \times 10^{-6}$ when the Cu composition is 10%, $7.3 \times 10^{-6}$ when the Cu composition is 15%, and $8.3 \times 10^{-6}$ when the Cu composition is 20%. As long as the thermal expansion coefficient of a material is larger than that of the skew adjustment element 30, the material other than the above-mentioned materials may be used for the carrier 50. In the present embodiment, the material having the thermal expansion coefficient larger than the thermal expansion coefficient of the skew adjustment element 30 is indicated as the material of the carrier 50, but a material having the thermal expansion coefficient smaller than the thermal expansion coefficient of the skew adjustment element 30 may be used as the material of the carrier 50. Since the thermal expansion coefficients of the carrier 50 and the skew adjustment element 30 differ from each other, a problem that the skew adjustment element 30 warps occurs.

In the optical receiver according to the first embodiment, voids 54 which are not filled up with the adhesive 52 are formed on both ends of the optical axis direction of the skew adjustment element 30 in a region where the skew adjustment element 30 and the carrier 50 are opposed to each other. Thereby, an adhesion area between the skew adjustment element 30 and the carrier 50 becomes small, so that an amount of warpage of the skew adjustment element 30 at the time of temperature change can be reduced even when the silicon having a large thermal expansion coefficient difference compared with the carrier 50 is used. As a result, the change of the light displacement amount can be restrained, the optical coupling loss can be reduced, and the optical receiver can be miniaturized.

Figure 7A:
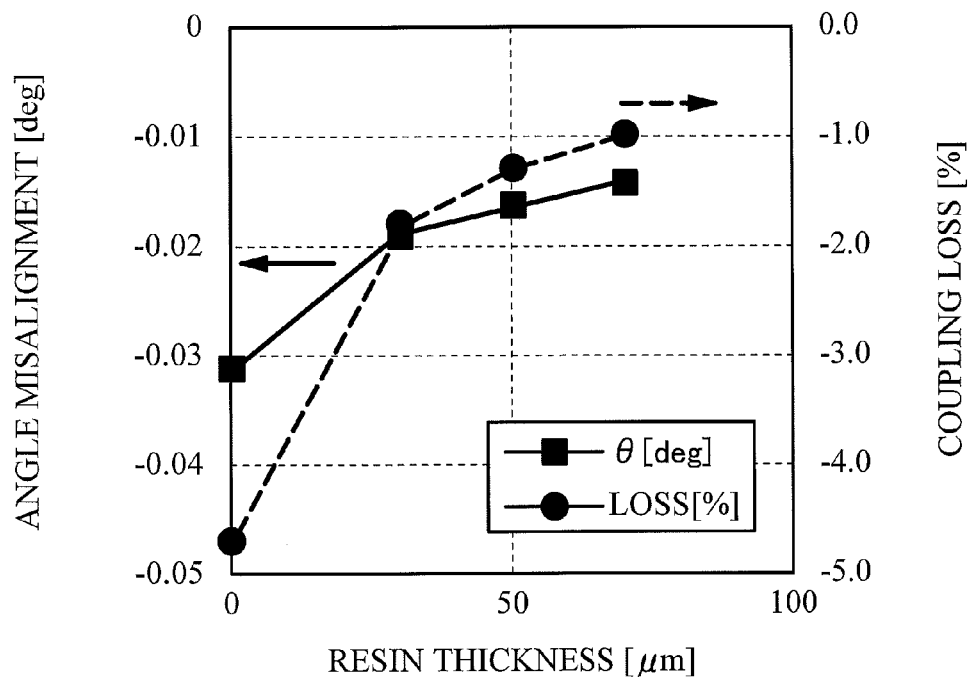
FIGS. 7A and 7B are graphs illustrating simulation results of the optical receiver according to the first embodiment.
Figure 7B:
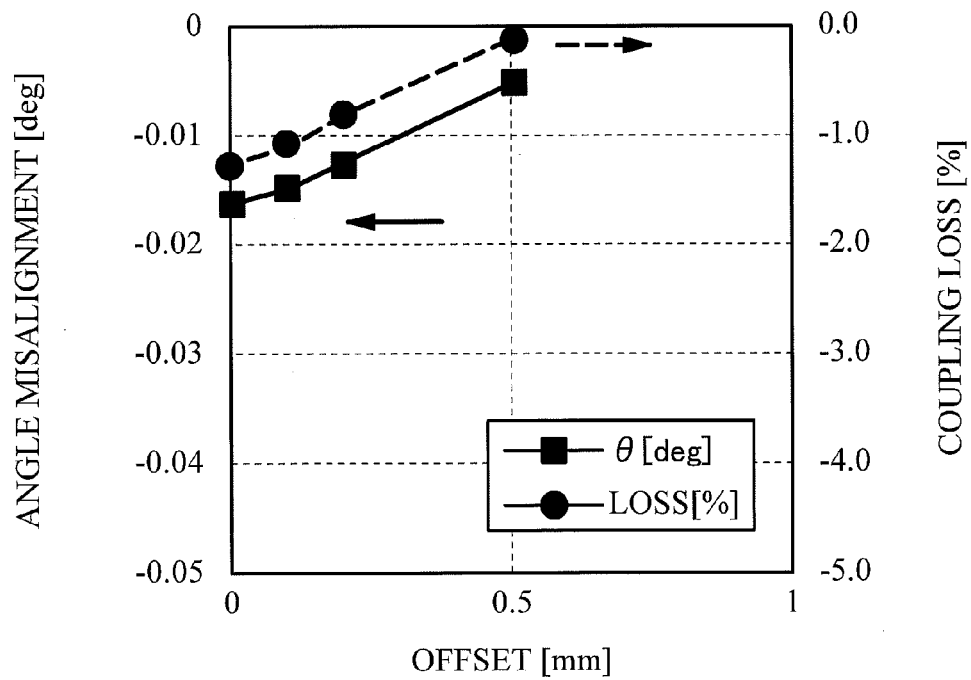

FIGS. 7A and 7B are graphs illustrating simulation results of the optical receiver according to the first embodiment. FIG. 7A is a graph illustrating a relationship between the thickness of the resin and the optical loss when the resin is used as the adhesive 52. A horizontal axis indicates the thickness of the resin, a vertical axis in the left side indicates an angle misalignment [θ] of the optical axis, and a vertical axis in the right side indicates the coupling loss [dB]. In FIG. 7A, an offset amount [mm] of the resin (i.e., the length in the optical axis direction of the region (voids 54) where the resin is not formed) is set as "0", and calculation is performed. FIG. 7B is a graph illustrating a relationship between the offset amount of the resin and the optical loss. Horizontal axes in the right and left sides are the same as those of FIG. 7A, and a horizontal axis indicates the offset amount [mm] of the resin. In FIG. 7B, the thickness of the resin is set as 50 μm, and calculation is performed.

As the thickness of the resin increases, the coupling loss and the angle misalignment approach 0 (i.e., they become small), as illustrated in FIG. 7A. However, the increase in cost and enlargement of equipment (i.e., the optical receiver) will be caused as the thickness increases. On the contrary, as the thickness of the resin reduces, the coupling loss and the angle misalignment become large, and inclination of the change also becomes steep after a certain point. Therefore, it is desirable that inclination of the coupling loss becomes below a fixed value, and it is desirable that the thickness of the resin is 50 μm, for example.

As the offset amount increases, the coupling loss and the angle misalignment approach 0 (i.e., they become small), as illustrated in FIG. 7B. In the present embodiment, the optical coupling loss was able to be set to about 0 when the thickness of the resin was set to 50 μm and the offset was set to 0.5 mm in the skew adjustment element 30 having the length in the optical axis direction of 2.2 mm.

Since the warpage of the skew adjustment element 30 occurs in the optical axis direction, it is desirable that the voids 54 are formed along the optic axis direction of the skew adjustment element 30. The voids 54 may be formed in the both sides of the adhesive 52 as illustrated in FIG. 6A, and they may be formed only in one side of the adhesive 52.

Since the fixed intensity of the adhesive deteriorates when the voids 54 become too large, it is desirable that each size of the voids 54 is the greatest size that can secure a sufficient fixed intensity. Specifically, it is desirable that the adhesive 52 is formed by 75-95% length of the skew adjustment element 30 in the optical axis direction.

With respect to the optical elements (i.e., the splitting element 12, the beam splitter 14, the optical hybrids 16x and 16y, the mirrors 32x and 32y, and lenses 34) other than the skew adjustment elements 30x and 30y in the first embodiment, not the silicon but the glass is used as the material. It is not necessary to arrange the voids 54 as mentioned above on the optical elements other than the skew adjustment elements 30x and 30y. The above-mentioned optical elements may be formed on the same carrier 50 as the skew adjustment element 30, and may be formed on another carrier. When the above-mentioned optical elements are formed on the same carrier 50, the efficiency of a manufacturing process can be improved by using the same adhesive 52.

Figure 8:
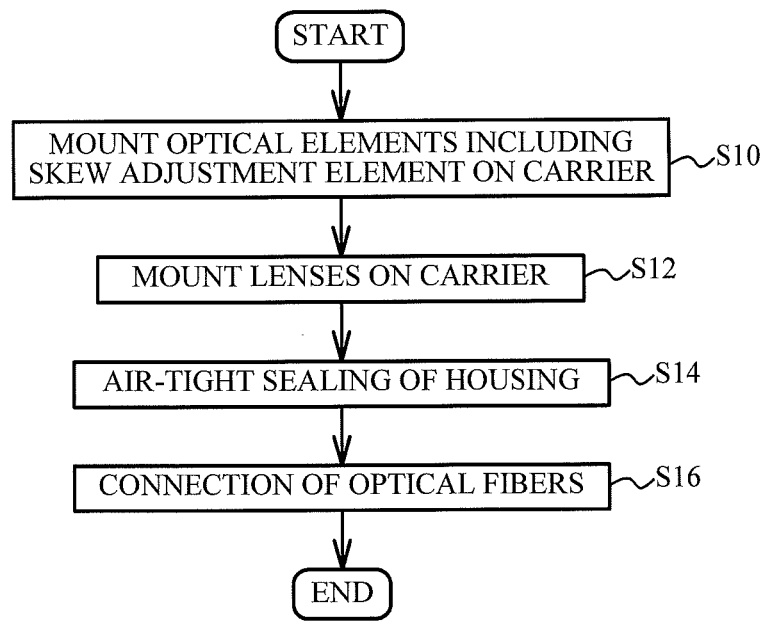
FIG. 8 is a flowchart illustrating a method for manufacturing the optical receiver according to the first embodiment.

FIG. 8 is a flowchart illustrating a method for manufacturing the optical receiver according to the first embodiment. First, the skew adjustment element 30 is mounted on the carrier 50 through the adhesive 52 (step S10). At this time, the voids 54 with which the adhesive 52 is not filled up are formed between the carrier 50 and the skew adjustment element 30. The splitting element 12, the beam splitter 14, the optical hybrids 16x and 16y and the mirrors 32x and 32y in other optical elements are mounted on the carrier 50 in parallel with a mounting process of the skew adjustment element 30.

Next, the lenses 34 are mounted on the carrier 50 (step S12). At this time, entering the light from dummy optical fibers, change of the light intensities in the light receiving elements 18 is observed, and the positions and the angles of the lenses are adjusted so that the amount of received light becomes maximum. Next, air-tight sealing of the housing 24 is carried out by seam welding or the like (step S14). Then, the optical fibers 26 and 28 are connected to the connectors 25 of the housing 24 (step S16). According to the above process, the optical receiver of the first embodiment is completed.

In the process (step S10) of mounting the skew adjustment element 30 on the carrier 50 among the manufacturing process of the optical receiver of the first embodiment, an amount of the adhesive 52 is adjusted, so that the void 54 is formed between the carrier 50 and the skew adjustment element 30. Thereby, the position, the size and the like of the void 54 can be changed arbitrarily.

(SECOND EMBODIMENT) A second embodiment is an example in which a concave portion for adjusting an amount of filling of the adhesive is provided on the carrier or the skew adjustment element.

Figure 9A:
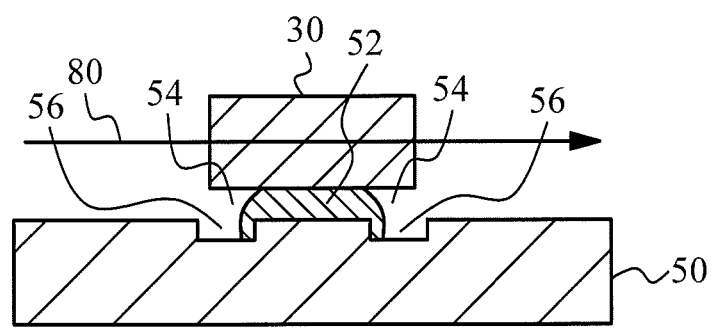
FIGS. 9A and 9B are diagrams illustrating detailed configuration of the optical receiver according to the second embodiment.
Figure 9B:
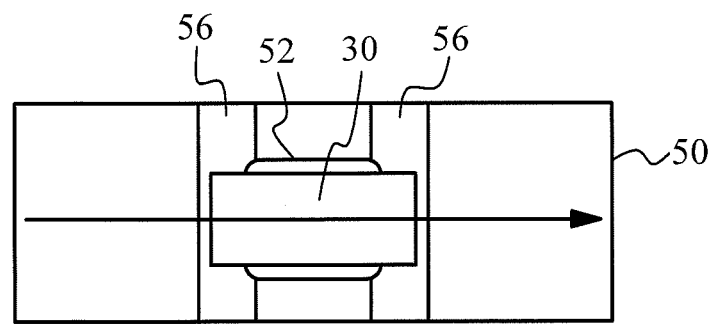

FIGS. 9A and 9B are diagrams illustrating detailed configuration of the optical receiver according to the second embodiment. Components identical with those of the first embodiment (FIG. 6) are designated by identical reference numerals, and detailed description thereof is omitted. In the second embodiment, the first concave portions 56 lower than an adhesion surface to the skew adjustment element 30 are formed on a surface (i.e., a side of the skew adjustment element 30) of the carrier 50. The first concave portions 56 are extended in a direction (e.g. a vertical direction) which intersects an optical axis 80 of the skew adjustment element 30, and can accommodate a surplus portion of the adhesive 52. Moreover, the first concave portions 56 are formed before and after the adhesive 52 (end portions where the adhesive 52 is not filled up) in a direction of the optical axis 80.

Figure 10:
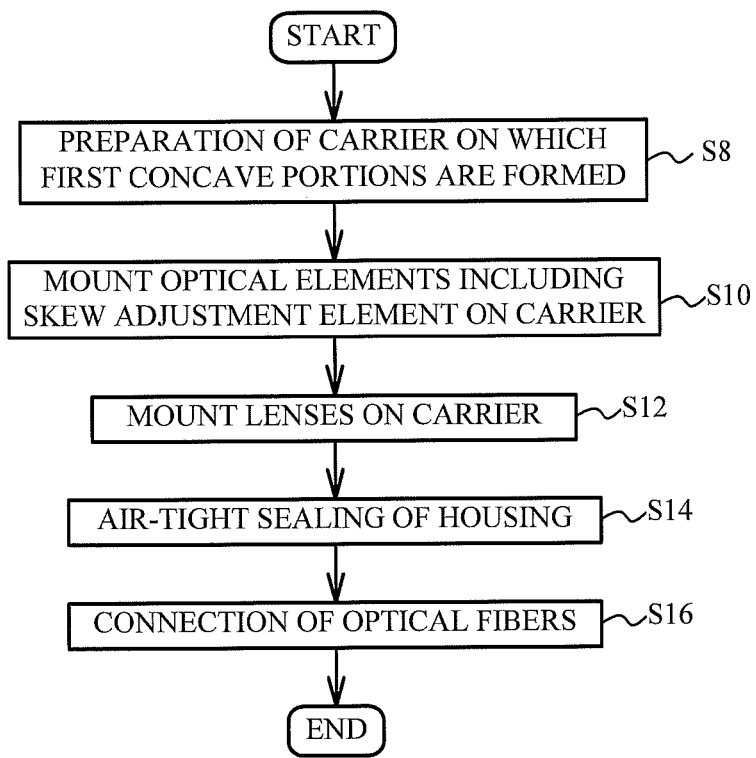
FIG. 10 is a flowchart illustrating a method for manufacturing the optical receiver according to the second embodiment.

FIG. 10 is a flowchart illustrating a method for manufacturing the optical receiver according to the second embodiment. Components identical with those of the first embodiment (FIG. 8) are designated by identical reference numerals, and detailed description thereof is omitted. First, the carrier 50 in which the first concave portions 56 that are extended in a direction intersecting the optical axis 80 of the skew adjustment element 30 are formed on a surface near the skew adjustment element 30 is prepared (step S8). Next, the skew adjustment element 30 and the other optical elements are mounted, as with the first embodiment (step S10). Then, the lenses 34 are mounted (step S12).

A size of the void 54 (i.e., an amount of offset) between the carrier 50 and the skew adjustment element 30 can be adjusted with an amount of the adhesive 52 to be applied on the carrier 50. However, when a semi-liquid-like resin is used as the adhesive, there is a problem that the controllability of the amount of offset gets worse. Then, the first concave portions 56 are formed on the carrier 50 as described in the second embodiment, and the surplus portion of the adhesive 52 flows into the first concave portions 56 by applying the adhesive 52 to a domain sandwiched between the first concave portions 56. Therefore, the adhesive 52 can be applied to the desired domain and the controllability of the amount of offset can be improved.

The first concave portions 56 may be formed only on one side of the skew adjustment element 30, and may be formed on both sides of the skew adjustment element 30 as illustrated in FIG. 9. When the first concave portions 56 are formed on both sides of the skew adjustment element 30, a position to which the adhesive 52 is applied is limited between the first two concave portions 56, and hence the controllability of the amount of offset can be further improved.

Figure 11A:
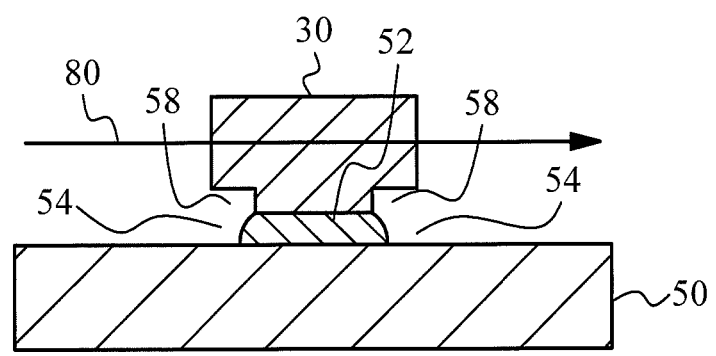
FIGS. 11A and 11B are diagrams illustrating detailed configuration of the optical receiver according to a variation example of the second embodiment.
Figure 11B:
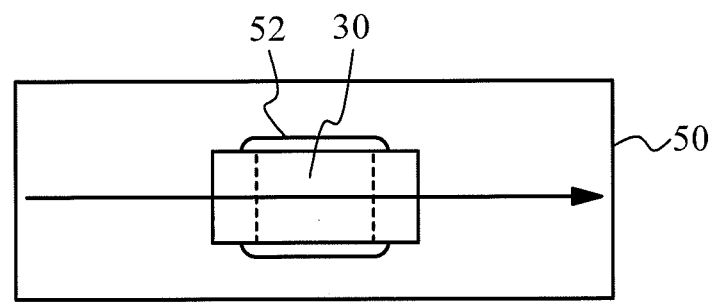

FIGS. 11A and 11B are diagrams illustrating detailed configuration of the optical receiver according to a variation example of the second embodiment. Components identical with those of the second embodiment (FIG. 10) are designated by identical reference numerals, and detailed description thereof is omitted. In the present variation example, the second concave portions 58 are formed on not the carrier 50 but the both sides (i.e., end portions where the adhesive 52 is not filled up) of a surface of the skew adjustment element 30 to which the adhesive 52 is applied. Since the second concave portions 58 are located at a place higher than a surface to which the adhesive 52 is applied, by one step from the carrier 50, the adhesive 52 does not reach the second concave portions 58 and the voids 54 are formed between the second concave portions 58 and the carrier 50. Thereby, even when the controllability at the time of applying the adhesive 52 to the carrier 50 gets worse, the voids 54 having a desired amount of offset can be formed.

As described above, even when the second concave portions 58 are formed on not the carrier 50 but the skew adjustment element 30, the controllability of the amount of offset can be improved as described in the second embodiment.

(THIRD EMBODIMENT) A third embodiment is an example in which the plate body for controlling modification is provided on a surface of the skew adjustment element 30 which is located on an opposite side of another surface of the skew adjustment element 30 near the carrier 50.

Figure 12A:
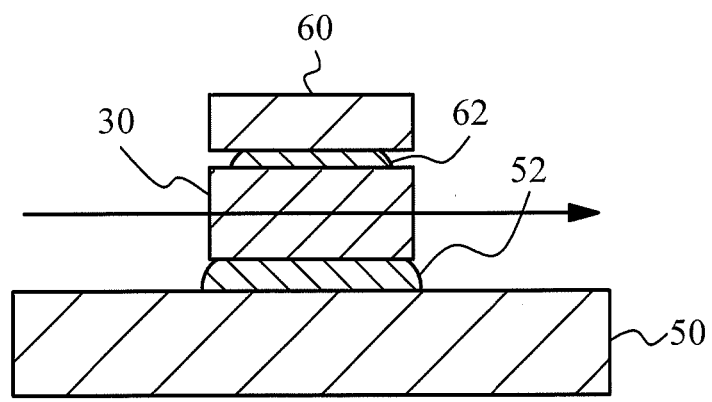
FIGS. 12A and 12B are diagrams illustrating detailed configuration of the optical receiver according to a third embodiment.
Figure 12B:
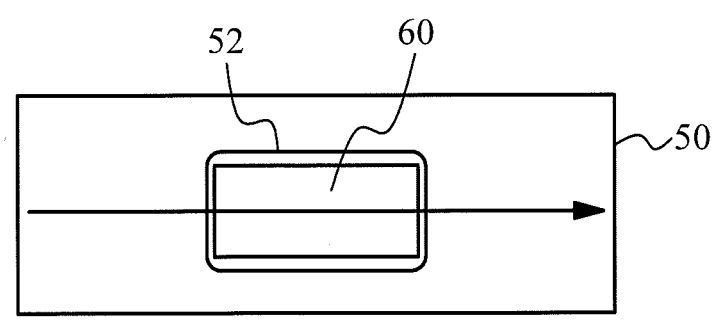

FIGS. 12A and 12B are diagrams illustrating detailed configuration of the optical receiver according to the third embodiment. Components identical with those of the first embodiment (FIG. 6) are designated by identical reference numerals, and detailed description thereof is omitted. In the third embodiment, the void 54 is not formed between the carrier 50 and the skew adjustment element 30, and all the adhesion surface of the skew adjustment element 30 is filled up with the adhesive 52. A plate body 60 is mounted through an adhesive 62 on a surface of the skew adjustment element 30 which is located on an opposite side of another surface of the skew adjustment element 30 near the carrier 50.

The plate body 60 is made of a material having a thermal expansion coefficient larger than the thermal expansion coefficient of the skew adjustment element 30, and the iron nickel cobalt (FeNiCo) alloy can be used for the plate body 60, as with the carrier 50, for example. With respect to the size of the plate body 60, the length in the optical axis direction can be set to 2.2 mm, the width can be set to 1 mm (i.e., this is the same as the skew adjustment element 30), and the height can be set to 0.5 mm, for example.

According to the optical receiver of the third embodiment, the plate body 60 having the large thermal expansion coefficient is provided on a surface of the skew adjustment element 30 which is located on the opposite side of another surface near the carrier 50. Thereby, the warpage caused by a difference of the thermal expansion coefficient between the carrier 50 and the skew adjustment element 30 offsets the warpage caused by a difference of the thermal expansion coefficient between the plate body 60 and the skew adjustment element 30, and hence an amount of warpage of the skew adjustment element 30 can be reduced. As a result, the change of the light displacement amount can be restrained, the optical coupling loss can be reduced, and the optical receiver can be miniaturized, as with the first and the second embodiments.

Figure 13:
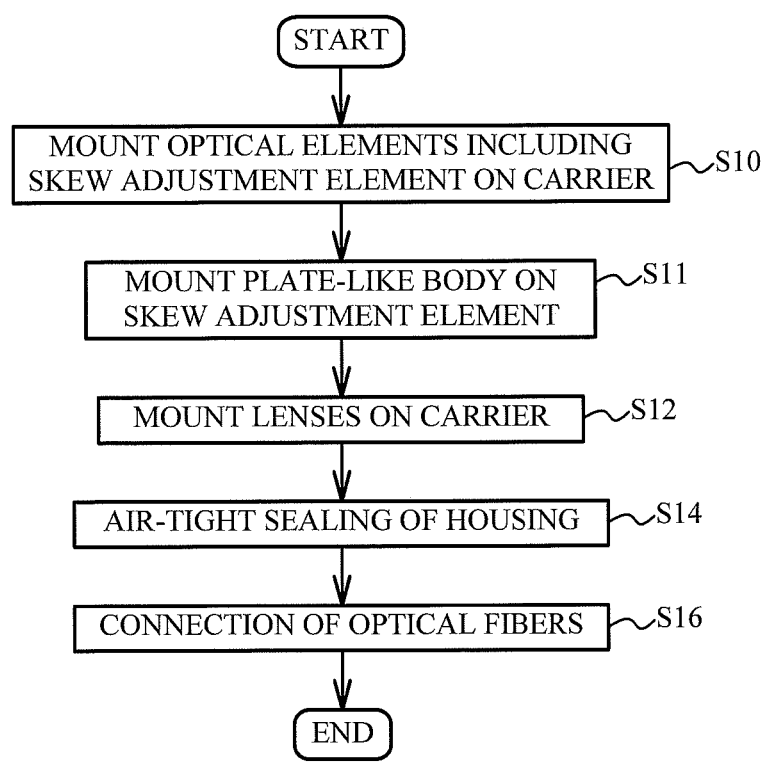
FIG. 13 is a flowchart illustrating a method for manufacturing the optical receiver according to the third embodiment.

FIG. 13 is a flowchart illustrating a method for manufacturing the optical receiver according to the third embodiment. Components identical with those of the first embodiment (FIG. 8) are designated by identical reference numerals, and detailed description thereof is omitted. First, the skew adjustment element 30 and the other optical elements are mounted, as with the first embodiment (step S10). Next, the plate body 60 is mounted on the skew adjustment element 30 (step S11). At this time, the adhesive (i.e., the second adhesive 62) used for mounting of the plate body 60 may be the same as the adhesive (i.e., the first adhesive 52) which is filled between the carrier 50 and the skew adjustment element 30, and the former may differ from the latter. In addition, it is desirable that the thermal expansion coefficient of the plate body 60 is the same as that of the carrier 50, or is a value close to that of the carrier 50.

After the plate body 60 is mounted, the lenses 34 are mounted (step S12). According to the above process, the optical receiver of the third embodiment is completed.

Here, the optical receiver of the third embodiment doe not include the voids 54 and the concave portions 56 and 58, but may include the voids and the concave portions.

Although the embodiments of the present invention are described in detail, the present invention is not limited to the specifically described embodiments, but includes other embodiments and variations within the scope of the claimed invention.

What is claimed is:

1. An optical receiver for coherent optical communication, comprising:
    a splitting element that splits a signal light into two optical axes;
    optical hybrids each of which is coupled with the two split optical axes;
    a skew adjustment element that is arranged on one of the optical axes, has a longitudinal direction along the one of the optical axes and adjusts a difference between optical path lengths of the two optical axes between the splitting element and the optical hybrids;
    a photodiode that receives interfering light output by one of the optical hybrids;
    a carrier;
    an adhesive that is filled between the skew adjustment element and the carrier; and
    a void that is located at an end portion of an optical axis direction of the skew adjustment element in a region where the skew adjustment element and the carrier are opposed to each other, the void being not filled up with the adhesive.

2. The optical receiver according to claim 1, wherein the skew adjustment element differs from the carrier in a thermal expansion coefficient.

3. The optical receiver according to claim 1, wherein the skew adjustment element is composed of silicon.

4. The optical receiver according to claim 1, wherein a region on the carrier corresponding to 75-95% length of the skew adjustment element in the optical axis direction is filled up with the adhesive.

5. The optical receiver according to claim 1, wherein in a surface of the carrier opposite to the skew adjustment element, a first concave portion that is lower than the surface of the carrier bonded to the skew adjustment element is formed on a position of the carrier corresponding to the end portion of the skew adjustment element.

6. The optical receiver according to claim 5, wherein the first concave portion is provided on one side or both sides of the adhesive in the optical axis direction of the skew adjustment element.

7. The optical receiver according to claim 1, further comprising a reflector that is arranged on one of the two split optical axes.

8. A method for manufacturing an optical receiver for coherent optical communication including a splitting element that splits a signal light into two optical axes, optical hybrids each of which is coupled with the two split optical axes, a skew adjustment element that is arranged on one of the optical axes, has a longitudinal direction along the one of the optical axes and adjusts a differences between optical path lengths of the two optical axes between the splitting element and the optical hybrids, a photodiode that receives interfering light output by one of the optical hybrids, and a carrier, the method comprising:
    fixing the skew adjustment element on the carrier via an adhesive; and
    fixing a lens on the carrier based on an intensity of light received by the photodiode when light is entered into the splitting element;
    wherein a void that is not filled up with the adhesive is formed along an optical axis direction of the skew adjustment element in a region where the skew adjustment element and the carrier are opposed to each other.

* * * * *